United States Patent
Trainin et al.

(10) Patent No.: US 9,923,663 B2
(45) Date of Patent: Mar. 20, 2018

(54) METHODS AND ARRANGEMENTS FOR TIME-SHARING IN A DENSE ENVIRONMENT

(71) Applicant: Intel IP Corporation, Santa Clara, CA (US)

(72) Inventors: Solomon B. Trainin, Haifa (IL); Tom Harel, Shefayim (IL); Igor Brainman, Kfar Saba (IL)

(73) Assignee: Intel IP Corporation, Santa Clara, CA (US)

( * ) Notice: Subject to any disclaimer, the term of this patent is extended or adjusted under 35 U.S.C. 154(b) by 274 days.

(21) Appl. No.: 14/229,792

(22) Filed: Mar. 28, 2014

(65) Prior Publication Data
US 2015/0282186 A1    Oct. 1, 2015

(51) Int. Cl.
*H04L 1/00* (2006.01)
*H04W 74/08* (2009.01)
*H04W 74/00* (2009.01)

(52) U.S. Cl.
CPC .......... *H04L 1/0009* (2013.01); *H04L 1/0003* (2013.01); *H04W 74/0816* (2013.01); *H04W 74/002* (2013.01)

(58) Field of Classification Search
CPC .......... H04W 72/082; H04W 72/0446; H04W 74/002; H04W 52/0238; H04W 74/0816; H04L 1/0003; H04L 1/0009
See application file for complete search history.

(56) References Cited

U.S. PATENT DOCUMENTS

| | | | | |
|---|---|---|---|---|
| 2010/0329178 | A1* | 12/2010 | Cordeiro | H04W 74/0816 370/328 |
| 2013/0117595 | A1* | 5/2013 | Murawski | H04W 52/0261 713/340 |
| 2014/0185502 | A1* | 7/2014 | Kenney | H04W 88/02 370/311 |
| 2015/0289147 | A1* | 10/2015 | Lou | H04B 7/0408 370/329 |

FOREIGN PATENT DOCUMENTS

| WO | 2010025100 A2 | 3/2010 |
|---|---|---|
| WO | 2010025100 A3 | 3/2010 |

* cited by examiner

*Primary Examiner* — Ian N Moore
*Assistant Examiner* — Justin T Van Roie

(57) ABSTRACT

Logic may enable communication between stations in the presence of interference. Logic may communicate with the station in the presence of interference, the interference from a communication between other stations comprising a first network allocation vector (NAV) reminder, by entering a mode in which a Control Physical layer (PHY) modulation and coding scheme (MCS) is enabled and a Single Carrier PHY MCS is disabled. Logic may enable the Single Carrier PHY MCS in response to receipt of a clear-to-send (CTS) or an expiration of a CTS timeout. Logic may determine an active time remainder during a Contention-based access period. Logic may determine a time to access a channel in response to receipt of the Denial to Send and based upon a predefined, maximum inactivity time. Logic may remain beamformed while the apparatus is in the Control PHY mode.

23 Claims, 6 Drawing Sheets

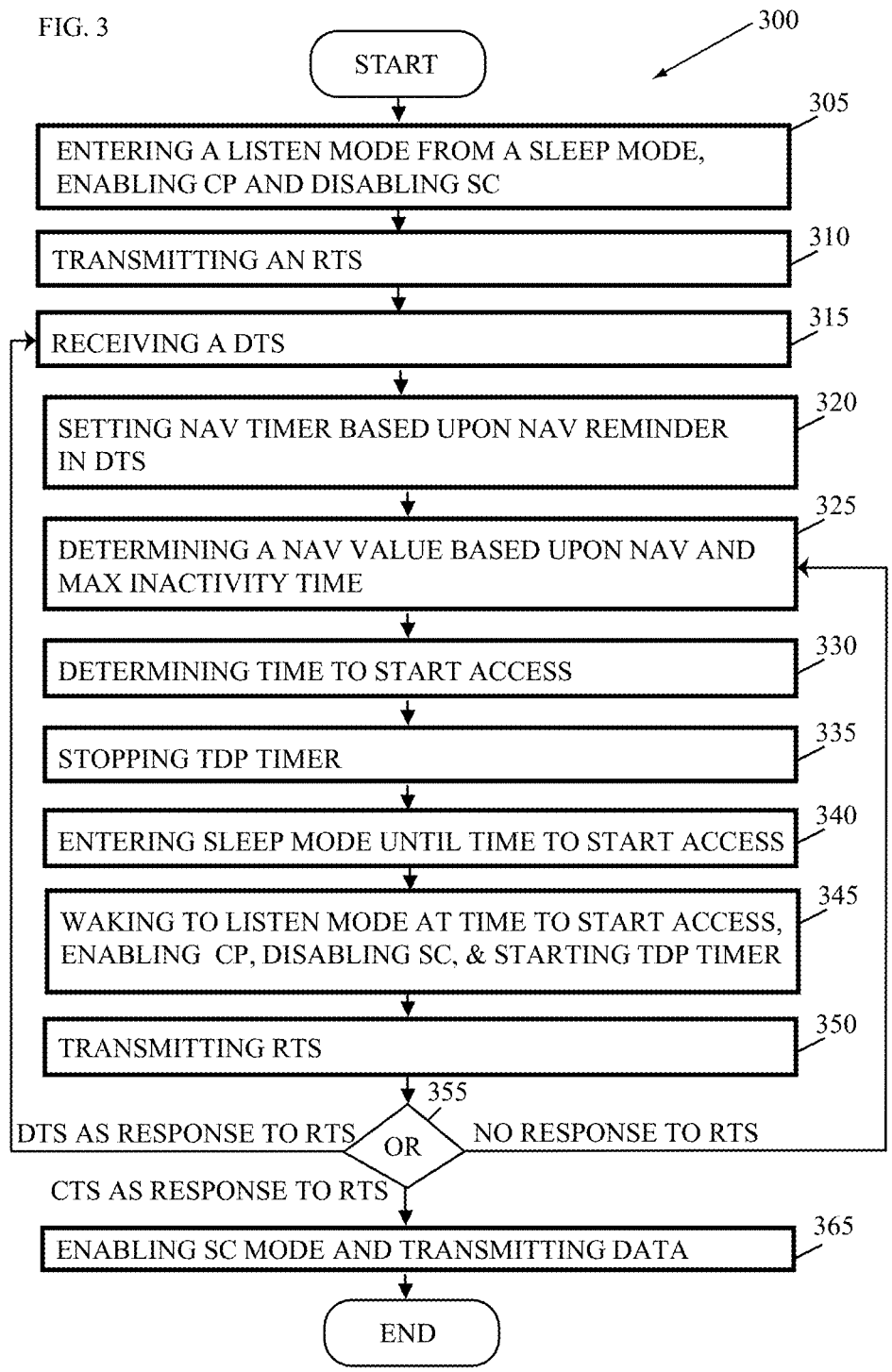

METHODS AND ARRANGEMENTS FOR TIME-SHARING IN A DENSE ENVIRONMENT

TECHNICAL FIELD

Embodiments are in the field of wireless communications. More particularly, embodiments may involve time-sharing in a dense environment.

BACKGROUND

In some wireless local area networks (WLANs) such as wireless docking networks, one or more stations may be mobile devices typically powered by battery and another device may be a dock typically AC powered. Areas that have multiple devices and docks and/or multiple devices that connect with the same dock, may be referred to as dense environments from the perspective of the wireless communications and the greater the density, the more likely that a collision of transmissions from different stations may occur.

In order to avoid collisions, stations may implement a listen before talk, time-sharing mechanism also known as Carrier Sense Multiple Access with Collision Avoidance (CSMA/CA). CSMA/CA assumes that any station's clear channel assessment mechanism has full information of the channel that includes physical and virtual (Network Allocation Vector) carrier sense. The physical carrier sense typically involves listening to or sampling a channel to detect a transmission prior to initiating a transmission. The virtual carrier sense may invoke the Network Allocation Vector (NAV) in transmissions to inform stations of a remaining duration of an ongoing transmission, which allows the non-participating stations to save power by going to sleep during the remainder of the transmission.

There are substantial limitations to the assumption of full information of the channel due to power limitation of the battery-powered device and due to interferences from hidden nodes. Hidden nodes may be nodes whose transmissions are hidden from the physical carrier sense, that are transmitting outside the receiving range of another station due to actual distance or obstacles, and that transmit interfering communications. Or hidden nodes may be nodes whose transmissions are hidden from the virtual carrier sense in that they are not transmitting while a station is listening to the channel but may transmit interfering communications. Mobile stations that need to operate with low power consumption, such as battery powered devices, may exacerbate this hidden node problem by entering a sleep mode while not actively transmitting.

Directive transmissions that may be implemented in, e.g., high speed transmissions such as transmissions in the 60 GHz (gigahertz) band, are particularly susceptible to the hidden node problem due the lowered ability to transmit around obstacles and the purposeful reduction in transmission distances, other than the direction of the receiving station, through constructive and destructive waveforms in a process referred to as beamforming.

Strong interference from a hidden node may prevent the station from receiving communications. For instance, a receiving station receives every signal directed at the receiving station but can only demodulate and decode a single signal transmission. If a hidden node begins transmitting to a receiving station while another station is also transmitting to that station, the receiving station may have so much interference that it may not receive either signal.

BRIEF DESCRIPTION OF THE DRAWINGS

FIG. 3 depicts an embodiment of a flowchart to enable communication with a station in the presence of interference;

DETAILED DESCRIPTION OF EMBODIMENTS

Figure 1:
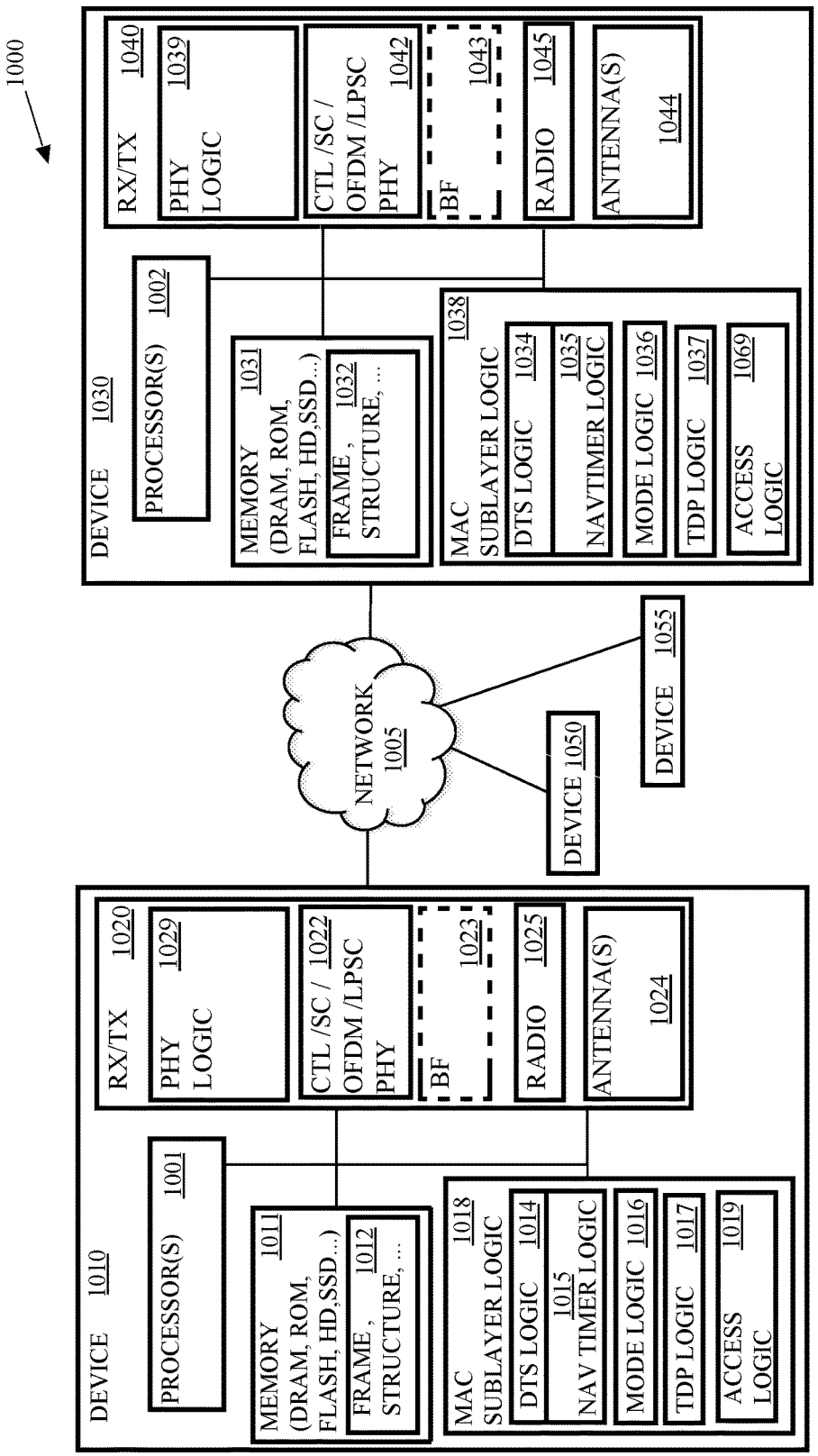
FIG. 1 depicts an embodiment of a wireless network comprising a plurality of communications devices with reverse direction logic.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments herein may resolve the problem of mobile device that has to be in sleep mode for some period of time to save power and is not able to collect up to date information of the virtual carrier sense. Embodiments herein may also resolve the problem of receiving NAV in interfering conditions. Furthermore, embodiments may enable communication between stations in the presence of interference with communications between the stations.

In many embodiments, transmissions between a first pair of stations may interfere with communications between a second pair of stations. This situation may arise because the first pair of stations are hidden from one or both of the stations of the second pair of stations and the signal passes closely enough to the second pair of stations that one or both receives the communication. Prior to the embodiments herein, such interference would prevent the second pair of stations from communicating for the duration of the interference. For instance, the second pair of stations may try to transmit an RTS but the signals of the RTS may intermix at the receiving station with the interference from the first pair of stations, preventing successful communication.

In several embodiments, the receiving station of the second pair may set its network allocation vector (NAV) timer based upon a NAV reminder in the communications between the first pair of stations. And in many embodiments, the receiving station of the second pair may enter a Control Physical layer (PHY) mode in which the Control PHY modulation and coding scheme (MCS) such as MCS0 is enabled and the Single Carrier (SC) MCS as well as other MCS's are disabled, to enable reception of the Control PHY communications with the transmitting station of the second pair. After receiving a ready to send (RTS) while the NAV has not expired (i.e., the interference is still present), the receiving station of the second pair may respond with a Denial-to-Send (DTS), indicating that it is not clear to send (CTS). Once the NAV timer expires or the communications between the first pair ends, the receiving station may reset the NAV timer to zero and enable the SC PHY MCS as well as other MCS's. The receiving station may also respond by transmitting a CTS.

The transmitting station may communicate with the receiving station in the presence of interference, the interference from a communication between the first pair of stations, by entering a mode in which a Control PHY MCS is enabled and a SC PHY MCS along with other MCS's are disabled. In many embodiments, the transmitting station may set its NAV timer in response to receipt of a DTS comprising a NAV reminder from the receiving station and may enter a sleep mode. In some embodiments, the transmitting station may determine a time to start access to a channel in response to receipt of the DTS and based upon a predefined, maximum inactivity time for the transmitting station. Thereafter, the transmitting station may enter an active mode and transmit an RTS to the receiving station.

In many embodiments, the transmitting station may enable the SC PHY MCS in response to receipt of a CTS or an expiration of a CTS timeout. In several embodiments, the transmitting station may determine an active time remainder during a contention-based access period (CBAP). And, in some embodiments, the second pair of stations may remain beamformed while in the Control PHY mode.

Various embodiments may be designed to address different technical problems associated with the problem of mobile device that has to be in sleep mode for some period of time to save power and is not able to collect up to date information of the virtual carrier sense. Other technical problems may include communicating in the presence of interference, switching between a Control PHY mode and a non-Control PHY mode, determining when the interfering communication ends, determining a time to start access, determining an active time remainder during a CBAP, determining a thermal design parameter (TDP) time remainder, remaining beamformed while in Control PHY mode, and/or the like.

Different technical problems such as those discussed above may be addressed by one or more different embodiments. For instance, some embodiments that address the mobile device in sleep mode that is not able to collect up to date information of the virtual carrier sense may do so by one or more different technical means such as entering a Control PHY mode in which a Control PHY modulation and coding scheme is enabled and a Single Carrier PHY modulation and coding scheme is disabled, setting a NAV timer based upon a second NAV reminder received in a DTS, determining an active time remainder during a CBAP, determining a time to access a channel in response to receipt of the DTS and based upon a predefined maximum inactivity time, remaining beamformed while in the Control PHY mode, and/or the like.

Some embodiments implement WirelessHD Specification Version 1.1D1, May 2010. Several embodiments may implement Ecma International, Standard ECMA-387, High Rate 60 GHz PHY, MAC and PALS, 2nd Ed., December 2010. Further embodiments may implement Wireless Gigabit Alliance, WiGig 1.1 specification, June 2011. Some embodiments implement Institute of Electrical and Electronic Engineers (IEEE) 802.11 systems such as IEEE 802.11ad systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf).

Some embodiments implement Institute of Electrical and Electronic Engineers (IEEE) 802.15 systems such as IEEE 802.15.3 systems and other systems that operate in accordance with standards such as the IEEE 802.15, IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs), IEEE Computer Society, The Institute of Electrical and Electronics Engineers, Inc., 3 Park Avenue, New York, N.Y., 29 Sep. 2003.

Some embodiments are particularly directed to improvements for wireless local area network (WLAN), such as a WLAN implementing one or more Institute of Electrical and Electronics Engineers (IEEE) 802.11 standards (sometimes collectively referred to as "Wi-Fi", or wireless fidelity).

Some embodiments, implement the Bluetooth® specification (e.g. BLUETOOTH SPECIFICATION Version 4.0, Bluetooth SIG, Inc., Publication date: 30 Jun. 2010). The embodiments, however, are not limited to these standards.

Several embodiments comprise Personal Basic Service Set (PBSS) Central Point, or PCP for and/or client devices of PCPs or stations (STAs) such as docking stations, routers, switches, servers, workstations, netbooks, mobile devices (Ultrabook™, Laptop, Smart Phone, Tablet, and the like).

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

This disclosure is not limited to WLAN related standards, but may also apply to wireless wide area networks (WWANs) and 3G or 4G wireless standards (including progenies and variants) related to wireless devices, user equipment or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The examples are not limited in this context.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1050 may comprise a low power communications device such as a consumer electronics device, a personal mobile device, an Ultrabook™, or the like. The communications device 1030 may comprise a low power communications device such as a consumer electronics device, a personal mobile device, a netbook, or the like, in the network 1005 of the communications device 1010. The communications device 1050 may comprise a docking station that functions as an access point (AP) and/or a Personal Basic Service Set (PBSS) Control Point (PCP). And communications device 1055 may comprise printers, laptops, netbooks, cellular phones, smart phones, PDAs, or other wireless-capable devices that also operate as stations. Thus, communications devices may be communicatively coupled via the network 1005 and be mobile or fixed.

The communications device 1010 may utilize antenna(s) 1024 to communicate with one or more stations, such as communication devices 1030, 1050, and 1055, via one or more antenna sectors. In the present embodiment, the communications device 1050 may be transmitting a communication to the communications device 1055 via a Single Carrier PHY (Physical layer) modulation and coding scheme (MCS). The communications device 1010 may be in a sleep mode. And the communications device 1030 may receive and decode the communications between the communications device 1050 and the communications device 1055 to determine that a Ready-To-Send (RTS) and/or a Clear-To-Send (CTS) of those communications include a network allocation vector (NAV) reminder indicating a time remaining until the end of the communication.

Receipt of the communication between the communications device 1050 and the communications device 1055 prevents the communications device 1030 from receiving other communications at the same time because the communications device 1030 may only be able to receive and process one communication at a time. Note that the communications between the communications device 1050 and the communications device 1055 may be close enough to the communications device 1010 for the communications device 1010 to receive and decode if the communications device 1010 were able to receive SC PHY MCS.

In the present embodiment, the communications device 1030 may comprise DTS logic 1034, NAV timer logic 1035, mode logic 1036, Thermal Design Parameter (TDP) logic 1037, and access logic 1039. The NAV logic 1035 may detect the NAV reminder in the interfering communications between the communications device 1050 and the communications device 1055 and set a NAV timer of the communications device 1030 to track the timing of the interference. In response to receiving the NAV reminder for the interfering communications, the mode logic 1036 may switch to a Control PHY mode in which the Control PHY MCS, such as MCS0, is enabled and other supported MCS's such as the SC MCS PHY are disabled. In several embodiments, the mode logic 1036 may enable the SC MCS PHY in response to an RTS while the NAV timer is reset to zero or upon transmitting CTS in response to an RTS.

The communications device 1010 may awake into a listen mode and mode logic 1016 may switch to a Control PHY mode in which the Control PHY MCS, such as MCS0, is enabled and other supported MCS's such as the SC PHY MCS are disabled. In many embodiments, the communications device 1010 and the communications device 1030 may stay beamformed when waiting to receive Control PHY modulated frames even though reception via other MCS's is disabled.

Furthermore, the communications device 1010 may comprise TDP logic 1017 to track the activity time of the communications device 1010 and may comprise access logic 1019 to determine a time to access the communications channel. In other words, the access logic 1019 may prevent waste of link time for the communication channel due to CF-End invisibility when the communications device 1010 is in a sleep mode.

The TDP logic 1017 may track the activity time of the communications device 1010 to avoid or reduce the chances of heat generation by activity of the communications device 1010 exceeding the communications device's 1010 ability to dissipate the heat. In other words, the TDP logic 1017 may prevent the communications device 1010 from having to shut down during a communication to protect the communications device 1010 from overheating.

The TDP logic 1017 may manage a TDP timer to track a TDP time remainder and a contention-based access period (CBAP) timer to track a CBAP time remainder. The contention-based access period may be a period in which the communications device is allowed to initiate and/or receive communications. The TDP logic 1017 may turn on the TDP timer while the communications device 1010 is in an active mode and stop the timer or slow down the timer, as shown in the calculations below, while the communications device 1010 is in an inactive mode such as a sleep mode to track the TDP time remainder. The CBAP timer may start when the access period starts and stop and be reset when the access period ends to track the CBAP time remainder.

At the start of the access period, the TDP logic 1017 may set cTDP_time_remainder=cTDP_time_limit+CFEnd_length, wherein the cTDP_time_remainder is the TDP time remainder, the cTDP_time_limit is the maximum activity time set for the communications device 1010, and the CFEnd_length is the duration of a transmission of a Contention-Free (CF) End control frame. The CF End control frame may be a MAC control frame and may indicate that a communication between two stations is ended. The TDP logic 1017 may also set the UCBAP_time_remainder=Allocation Block Duration, wherein the UCBAP_time_remainder is the amount of time remaining in the access period and the Allocation Block Duration is the duration of the access period.

During the access period, the TDP logic 1017 may, at the start of inactivity, set cTDP_time_reminder_at_Inactive_start=cTDP_time_reminder, and at the end of inactivity, set cTDP_time_reminder_at_Inactivity_end= cTDP_time_reminder_at_Inactive_startPower_saving_coefficient*Time_to_start_access, wherein the cTDP_time_reminder_at_Inactive_start is the TDP time remainder when the communications device 1010 enters an inactive period. The cTDP_time_reminder_at_Inactivity_end is the TDP time remainder when the communications device 1010 exits an inactive period, the Power_saving_coefficient is the amount of power savings by the communications device 1010 during the inactive period, and the Time_to_start_access indicates a time at which the communications device 1010 should enter an active mode such as a listen mode to communicate with the communications device 1030 during the access period. Furthermore, the TDP logic 1017 may calculate the TDP Time remainder as cTDP_time_reminder=Minimum of (cTDP time reminder_at_Inactive_end, UCBAP_time_reminder), wherein the "Minimum of ( )" is a minimum value selection function to select the minimum of the values in the parentheses, i.e., cTDP time reminder_at_Inactive_end and UCBAP_time_reminder.

The access logic 1019 may track the Time_to_start_access. The access logic 1019 may set the NAV timer as NAV_value=Minimum of (NAV, UCBAP_time_reminder). If NAV_value>Max_Inactivity_time, NAV_value=NAV_value−Max_Inactivity_time, wherein the NAV_value is an alternative to the value of the NAV timer in the communications device 1010 that may awake the communications device 1010 for communication prior to the end of the full NAV set. And the Max_Inactivity_time is a predefined time period for which the communications device 1010 may remain inactive during an access period.

The access logic 1019 may set the Time_to_start_access=Minimum of (NAV_value, Max_Inactivity_time). Note that the NAV_value may be used for situations in which no response to an RTS is received from the communications device 1030 that is sent before full NAV expiration.

The entry of the communications device 1010 into the Control PHY mode may allow reception by the communications device 1010 of Control PHY transmissions despite interference by SC PHY MCS communications such as the interfering communications between the communications devices 1050 and 1055. While in the Control PHY mode, the communications device 1010 may not be able to decode transmissions to detect NAV reminders in the transmissions between communications devices 1050 and 1055 in SC PHY MCS so the communications device 1010 may transmit an RTS to the communications device 1030 to initiate a communication.

In response to the RTS, the communications device 1030 may transmit a DTS that includes a NAV reminder that is based upon the NAV reminder received by the communications device 1030 in the interfering communications between the communications devices 1050 and 1055.

Figure 2A:
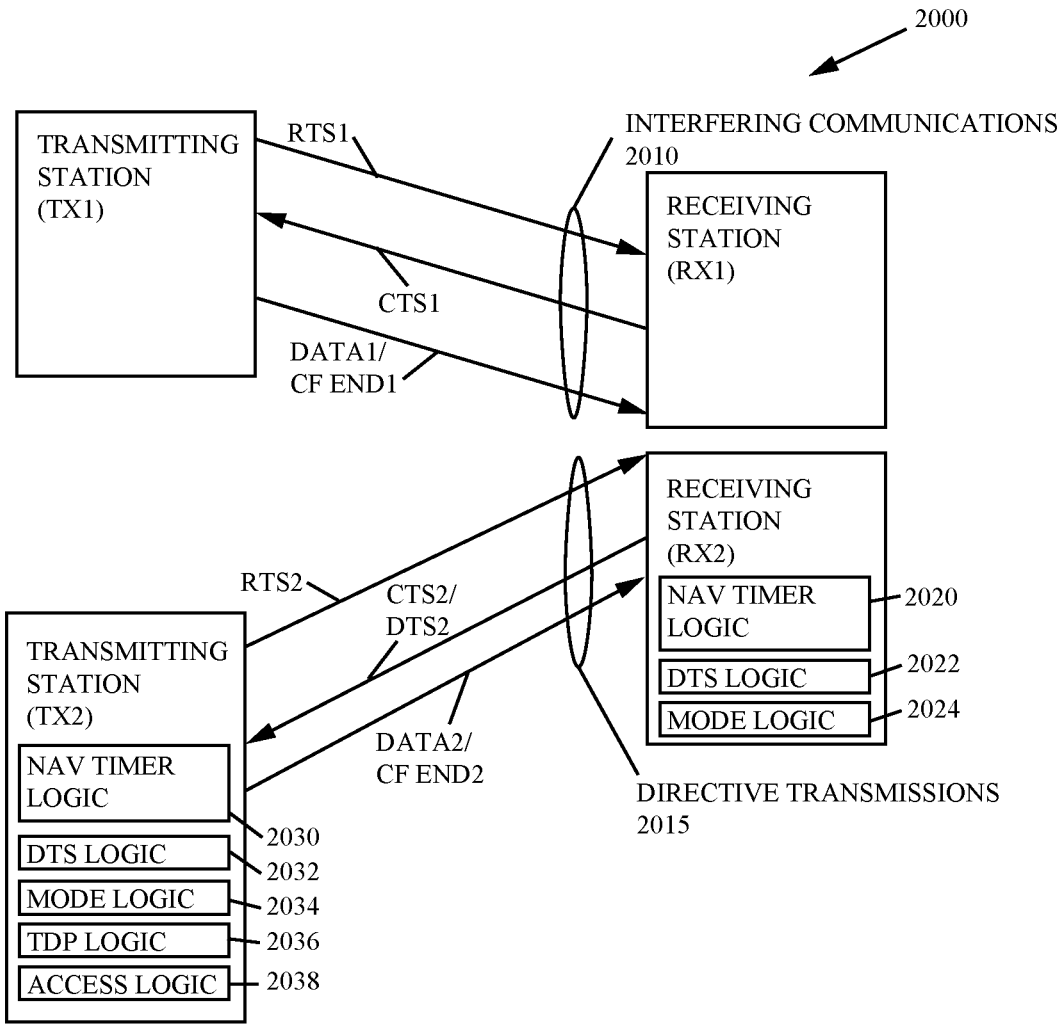
FIG. 2A depicts an embodiment of a block diagram for a first transmitting station's communications with a first receiving station, the communications interfering with communication between a second transmitting station and a second receiving station.
Figure 2B:
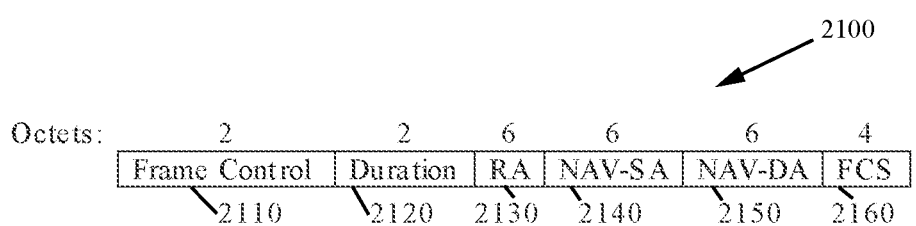
FIG. 2B depicts an embodiment of a frame of a Denial-To-Send described in conjunction with FIG. 2A.
Figure 2C:
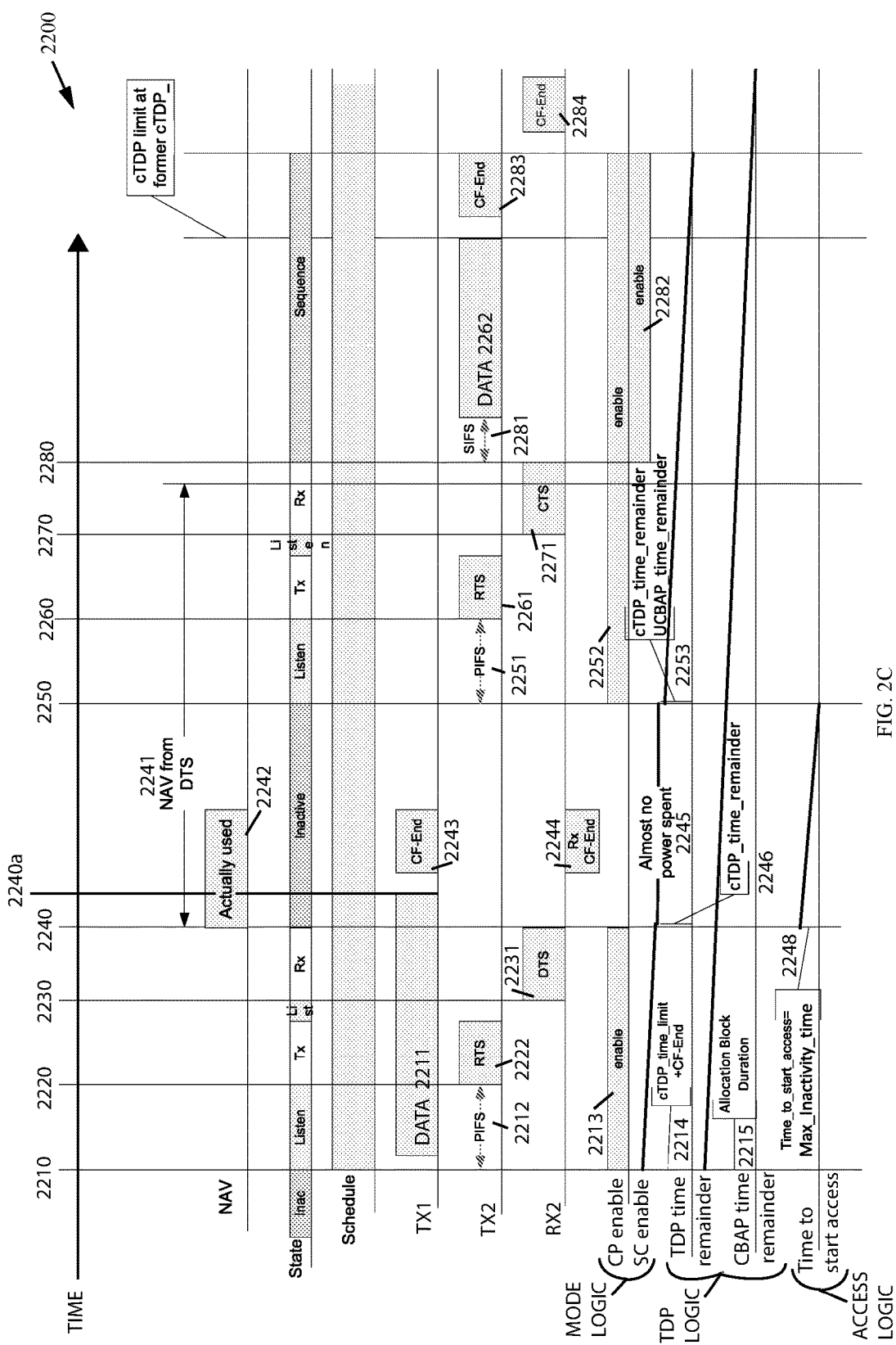
FIG. 2C depicts an embodiment of a timing diagram of some embodiments described in conjunction with FIG. 2A.

Referring now to the FIGS. 2A-C, there are shown three different embodiments, an embodiment 2000 of communications between four stations, an embodiment of a DTS frame 2100, and an embodiment of a timing diagram 2200. FIG. 2A illustrates an embodiment 2000 of communications between a transmitting station TX1 and a receiving station RX1 including an RTS1, a CTS1, a DATA1 and a CF End1. These communications are referred to as interfering communications 2010 because these communications represent, for the purposes of this illustration, interference at the receivers of the transmitting station TX2 and the receiving station RX2.

The transmitting station TX2 may be in a sleep mode during the RTS and CTS exchange in the interference communications 2010 so the transmitting station may not receive a NAV reminder related to the interfering communications but the receiving station RX2 may receive the RTS1 and/or CTS1. In response to receipt of the NAV reminder from the interfering communications 2010, NAV timer logic 2020 of the receiving station RX2 may set a NAV timer of RX2 to expire at the expiration of the interfering communications NAV 2241. Furthermore, the mode logic 2024 of RX2 may transition RX2 into a Control PHY mode 2213 in which the Control PHY MCS is enabled and SC PHY MCS is disabled.

The timing diagram 2200 begins at this point, i.e., time 2210. Note that in the timing diagram, the time passes from left to right and the time indications on the timeline such as 2210 signify points in time to which the following discussion of the FIGS. 2A-2C will refer. Furthermore, the rows illustrate the activity of state of the NAV, state of TX2, schedule of the channel, and activity of the stations and the logic of TX2.

At the time 2210, TX1 is about to transmit data 2211, TX2 wakes from an inactivity mode into a listen mode, RX2 is active and in the Control PHY mode 2213, mode logic 2034 enables a Control PHY mode 2213 for TX2, and TDP logic 2036 tracks the TDP time remainder 2214 and the CBAP remainder 2215 for TX2. TX2 listens for a Packet Control Function (PCF) Interframe Space (IFS), referred to as a PIFS 2212, to determine whether the communications channel is busy. And then, at time 2220, TX2 transitions to a transmission mode, transmits an RTS2 2222 to RX2, and transitions back into a listen mode.

At time 2230, RX2 contains a NAV 2241 from an RTS/CTS exchange of the interfering communication 2010. Due to the NAV< >0 according to the NAV timer of RX2, DTS logic 2024 of RX2 responds with a DTS 2231 in Control PHY MCS.

The DTS 2231 may be a MAC frame that comprises a frame control field 2110, a duration field 2120, a receive address field 2130, a NAV Source address field 2140, a NAV Destination address field 2150, and a Frame Control Sequence (FCS) field 2160. Note that this is just one embodiment of a DTS frame and the number and types of fields may vary between embodiments. For the purposes of this embodiment, the DTS 2231 frame comprises an indication that the frame is a DTS frame such as in a frame type subfield of the frame control field 2110 and a NAV reminder in the Duration field 2120.

At time 2230, the DTS 2231 is received by DTS logic 2032 of TX2 despite the interfering communications 2010 (DATA 2211) in the form of SC frames because the mode logic 2034 maintains TX2 in the Control PHY mode and SC PHY MCS is disabled. At time 2240, the access logic 2038 of TX2 may compare the NAV reminder included in the received DTS 2231 by RX2 with the Max_Inactivity_time. In this example, the NAV is longer than the Max_inactivity_time so TX2 transitions into a sleep mode for the Max_Inactivity_time. Almost no power is spent 2245 while in sleep mode so TX2 will be able to have transaction of cTDP_time-remainder in duration when the NAV is indicated expired or truncated.

At the time 2240*a*, the data 2211 transmission concludes and TX1 transmits a CF End 2243 that truncates the NAV 2241. At time 2240, the access logic 2038 tracks the time to start access by counting down the Max_inactivity_time 2248 to time 2250. At time 2250, TX2 enters the listen mode from the inactive mode, the TDP logic 2036 begins counting down the TDP time remainder 2253 as active mode, and mode logic 2034 enters the Control PHY mode 2252 in which SC PHY MCS is disabled.

After a PIFS 2251, at time 2260, TX2 transmits an RTS2 2261. As result, TX2 receives CTS 2271 and starts a data sequence mode by transmitting data 2262 to RX2 a short interframe space (SIFS) 2281 thereafter. At the point of sending/receiving CTS 2271, mode logic 2034 of TX2 and mode logic 2024 of RX2 both switch their receivers to enable reception of SC PHY MCS 2282. Once the data 2262 and other data transmission is completed, TX2 may transmit a CF-End 2283 to indicate the end of the data 2262 transmission and RX2 may transmit a CF-End 2284 to accomplish the end of the data 2262 transmission.

Referring again to FIG. 1, the network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, the network 1005 communicatively couples communications devices 1010, 1030, 1050, and 1055.

The communication devices 1010 and 1030 comprise processor(s) 1001 and 1002, memory 1011 and 1031, and MAC sublayer logic 1018 and 1038, respectively. The processor(s) 1001 and 1002 may comprise any data processing device such as a microprocessor, a microcontroller, a state machine, and/or the like, and may execute instructions or code in the memory 1011 and 1031. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may be coupled with the MAC sublayer logic 1018 and 1038, respectively, and/or may be coupled with the PHY devices, transceiver 1020 and 1040, respectively. In many embodiments, the memory 1011 and 1031 may comprise memory 1012 and 1032, respectively. The memory 1012 and 1032 may be allocated to store the frames and/or the frame structures, as well as frame headers or portions thereof. In many embodiments, the frames may comprise fields based upon the structure of the standard frame structures identified in IEEE 802.11.

The MAC sublayer logic 1018 and 1038 may comprise logic to implement functionality of the MAC sublayer of the data link layer of the communications devices 1010 and 1030, respectively. The MAC sublayer logic 1018 and 1038 may generate the frames such as management frames, data frames, and control frames, and may communicate with the PHY logic 1029 and 1039, respectively. The PHY logic 1029 and 1039 may generate physical layer protocol data units (PPDUs) based upon the frames. More specifically, the frame builders may generate frames and the data unit builders of the PHY logic 1029 and 1039 may prepend the frames with preambles to generate PPDUs for transmission via a physical layer (PHY) device such as the transceivers (RX/TX) 1020 and 1040, respectively.

Figure 4:
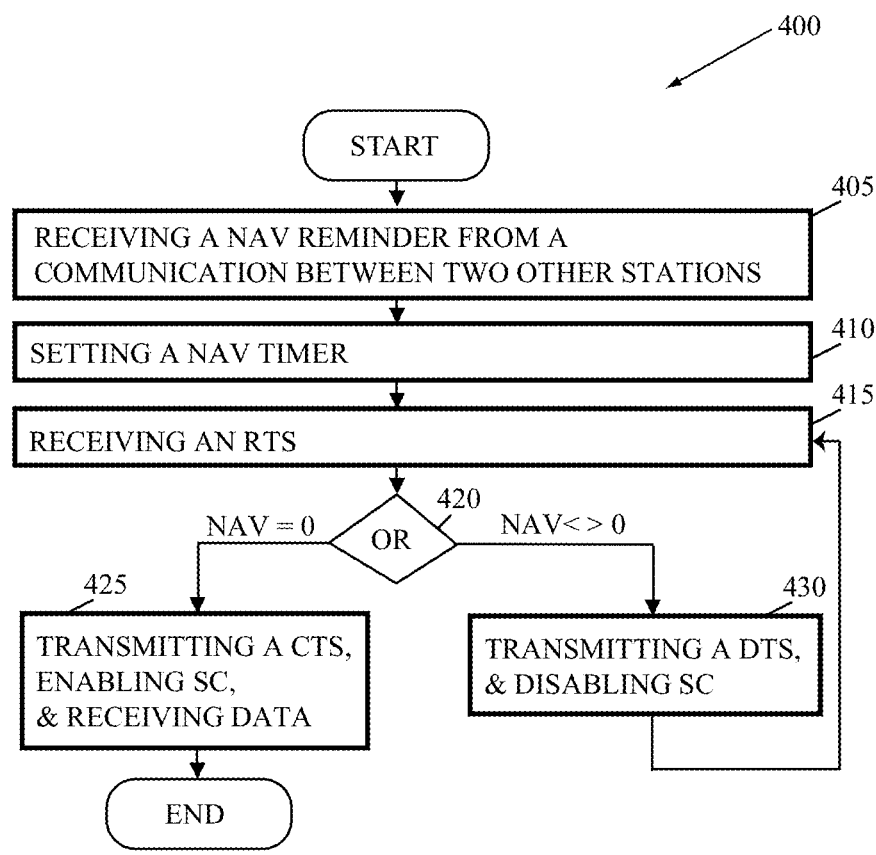
FIG. 4 depicts another embodiment of a flowchart to enable communication by a station in the presence of interference.

In the present embodiment, the MAC sublayer logic 1018 and 1038 may comprise DTS logic 1014, NAV timer logic 1015, mode logic 1016, TDP logic 1017, and access logic 1019 to implement procedures for time-sharing such as the procedures described in conjunction with the flowcharts 300 and 400 illustrated in FIGS. 3 and 4.

The MAC frame, also referred to as MAC layer Service Data Units (MSDUs), may comprise, e.g., a management frame. For example, a frame builder may generate a management frame such as the beacon frame to identify the communications device 1010 as having capabilities such as supported data rates, power saving features, cross-support, and a service set identification (SSID) of the network to identify the network to the communications device 1030. The MAC sublayer logic 1018 may pass the frame to the PHY logic 1029 and the PHY logic 1029 may prepend a preamble to generate a PHY frame prior to transmitting the PHY frame. The PHY frame is also referred to as a PPDU.

The communications devices 1010, 1030, 1050, and 1055 may each comprise a transmitters and receivers such as transceivers (RX/TX) 1020 and 1040. In many embodiments, transceivers 1020 and 1040 implement four different PHY layers: Control PHY, SC (single carrier) PHY, OFDM PHY and low-power SC PHY (LPSC PHY). Control PHY is modulation and coding scheme 0 (MCS0). SC starts at MCS1 and ends at MCS12; OFDM PHY starts at MCS13 and ends at MCS24; and LPSC starts at MCS25 and ends at MCS31. MCS0 to MCS4 may be mandatory PHY MCSs.

In the present embodiments, the CTL/SC/OFDM/LPSC PHY 1022 and 1042 represent modules of hardware and code to implement these different modulation and coding schemes. Note that this is just illustrative of the schemes that may be included in many embodiments but embodiments are not so limited. For example, other embodiments may only have one or more MCS's of the Control PHY and SC PHY or one or more MCS's of the Control PHY, SC PHY, and OFDM.

The CTL/SC/OFDM/LPSC PHY 1022 and 1042 may implement a method of encoding digital data on multiple carrier frequencies. The CTL/SC/OFDM/LPSC PHY 1022 and 1042 may comprise a frequency-division multiplexing scheme used as a digital multi-carrier modulation method. Data may be carried in a large number of closely spaced orthogonal subcarrier signals. The data may be divided into several parallel data streams or channels, one for each subcarrier. Each subcarrier may be modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs.

Guard intervals may be inserted between symbols such as between every OFDM symbol as well as between the short training field (STF) and long training field (LTF) symbols in the front end of the transmitter during transmission to avoid inter-symbol interference (ISI). ISI might result from multipath distortion.

Each transceiver 1020 and 1040 comprises a radio 1025 and 1045, respectively, comprising an RF transmitter and an RF receiver. The CTL/SC/OFDM/LPSC PHY 1022 and 1042 may transform information signals into signals to be applied via the radios 1025 and 1045 to elements of an antenna(s) 1024 and 1044, respectively. An RF receiver receives electromagnetic energy at an RF frequency via elements of an antenna(s) 1024 and 1044 and radios 1025 and 1045, respectively. The CTL/SC/OFDM/LPSC PHY 1022 and 1042 may extract the digital data from the symbols received via the radios 1025 and 1045, respectively.

In some embodiments, the communications device 1010 comprises a Beam Former (BF) 1023. The BF 1023 may comprise a device that performs digital beam forming such as a Digital Beam Former (DBF) or any other process for beam forming. The BF 1023 may process to signals to create directional transmissions based upon constructive and destructive interferences between the waveforms to be applied to elements of antenna(s) 1024. The antenna(s) 1024 may be an array of individual, separately excitable antenna elements. The signals applied to the elements of the antenna(s) 1024 cause the antenna(s) 1024 to radiate one to four spatial channels. Each spatial channel so formed may carry information to one or more of the communications devices 1030, 1050, and 1055.

Similarly, the communications device 1030 comprises the transceiver (RX/TX) 1040 to receive and transmit signals from and to the communications device 1010. The transceiver (RX/TX) 1040 may comprise an antenna(s) 1044 and, optionally, a BF 1043. The elements of the antenna(s) 1044 may receive signals in, e.g., one to four spatial channels and the BF 1043 may be trained to received directional signals from a transmitter.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

FIG. 3 depicts an embodiment of a flowchart 300 to enable communication with a station in the presence of interference. In particular, FIG. 3 depicts an embodiment of a flowchart 300 of a station such as the communications device 1010 of FIG. 1 to awake from a sleep mode in midst of interference without the benefit of a virtual carrier sense of the interference, communicate with a another station to determine when to transmit, and to transmit a communication to the other station while tracking activity for the purposes of monitoring thermal dissipation and providing sleep periods to improve power efficiency and operate with low power consumption.

The flowchart 300 begins with entering a listen mode from a sleep mode, enabling a Control PHY MCS, and disabling a SC PHY MCS (element 305). In many embodiments, the station awakes into a listen mode with SC PHY MCS disabled so that the station can receive Control PHY MCS communications in the presence of SC PHY MCS interference. In some embodiments, the listen mode lasts for a PIFS before the station enters a transmit mode. In other embodiments, the listen mode may be a different duration and in further embodiments, the station may transition directly into the transmit mode from the sleep mode.

After entering the transmit mode, the station may transmit an RTS to a receiving station (element 310) and the receiving station may respond with a DTS (element 315) to indicate that the station should not transmit the communication and to indicate a NAV reminder. The NAV reminder may be a duration associated with the expected duration of the interference.

In response to receiving the DTS, the station may set a NAV timer based upon the NAV reminder in the DTS (element 325), determine a NAV_value based upon the NAV and a predefined Max_inactivity_time associated with the station (element 320) to determine a time to start access (element 330). The time to start access may be a time at which the station will awake to attempt to transmit the communication again to the receiving station. In many embodiments, the station may reenter the sleep mode (element 340) and stop the TDP timer (element 335) until the expiration of the time to start access. In several embodiments, the station may consume some power during the sleep mode so the station may determine the amount of power consumed during the sleep mode and set the TDP remainder accordingly.

At the expiration of the time to start access, the station may wake into a listen mode, e.g., for a PIFS, enable the Control PHY MCS, disable the SC PHY MCS, and start the TDP timer (element 345). If the station does not receive a communication during the listen mode, the station may begin to transmit an RTS to the receiving station (element 350). If the station receives a DTS in response to the RTS then the station may return to element 315. If the station receives a CTS in response to the RTS then the station may enable the SC PHY MCS and transmit the data communication to the receiving station (element 365). And if the station does not receive a response to the RTS, e.g., expiration of a CTS timeout, the station may return to element 325 to determine the NAV value. In some embodiments, for instance, the NAV may be truncated by transmission of, e.g., a CF End, so the NAV at the receiving station may be reset to NAV=zero, and the station may be able to transmit the data communication prior to the expiration of the original NAV.

FIG. 4 depicts an embodiment of a flowchart 400 to enable communication by a station in the presence of interference. In particular, FIG. 4 depicts an embodiment of a flowchart 400 of a station such as the communications device 1030 of FIG. 1 to detect and set a NAV timer based upon interference from communications between two other, interfering stations and detect and set the NAV timer based upon a truncation of NAV by a CF End transmission or the like.

The flowchart 400 begins with receiving a NAV reminder from a communication between two other interfering stations (element 405). The communication may be an RTS, a CTS, or another transmission between the other two interfering stations that includes a NAV reminder. In many embodiments, the station may respond by setting the NAV timer (element 410) and switching to a Control PHY mode. The Control PHY mode may enable only the Control PHY MCS and may allow communication with another station despite the interfering communications from the interfering stations to coordinate transmission of a communication to or from the station.

Thereafter, the station may receive an RTS from a transmitting station (element 415). In some embodiments, before receiving an RTS from a transmitting station, the station may receive a communication from the interfering stations indicating that the interfering communications have truncated the previously set NAV. In response, the station may set its NAV timer to the new NAV and may respond to the RTS from the transmitting station based upon whether the NAV timer expired or not. If the NAV timer has expired and has been reset to zero (element 420), the station may enable SC PHY MCS, transmit a CTS in response to the RTS, and receive the communication from the transmitting station (element 425). On the other hand, if the NAV timer has not expired, the station may transmit a DTS to the transmitting station with a NAV reminder and disable SC PHY MCS or continue to remain in the Control PHY mode (element 430). If the NAV timer did not expire then the flowchart returns to element 415 to receive an RTS from the transmitting station and to determine how to respond based upon the status of the NAV timer (element 420).

Figures 5A, 5B:
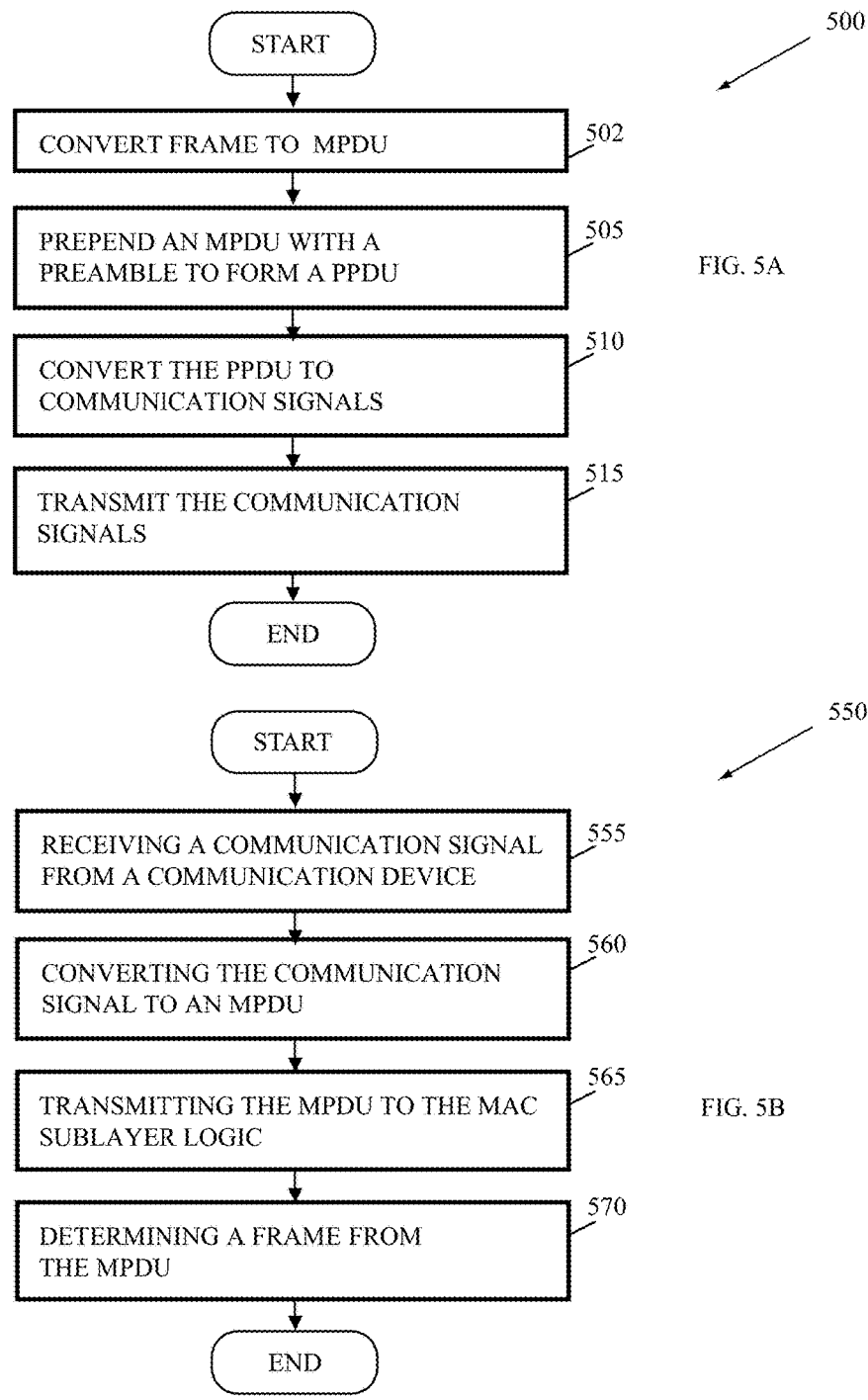
FIGS. 5A-B depict embodiments of flowcharts to transmit, receive, decode, and interpret communications as illustrated in and described with respect to FIGS. 1-2.

FIGS. 5A-B depict embodiments of flowcharts 500 and 550 to transmit, receive, and interpret communications with a frame. Referring to FIG. 5A, the flowchart 500 may begin with receiving a frame such as a control frame with a NAV reminder from the frame builder. The MAC sublayer logic of the communications device may generate the control frame such as an RTS, a CTS, or a DTS to transmit to another station, may convert the frame to an MAC protocol data unit (MPDU) (element 502) and transmit the MPDU to a data unit builder to transform the data into a packet that can be transmitted to the other station. The data unit builder may generate a preamble to prepend the PHY service data unit (PSDU) (the MPDU from the frame builder) to form a PHY protocol data unit (PPDU) for transmission (element 505). In some embodiments, more than one MPDU may be prepended in a PPDU.

The PPDU may then be transmitted to the physical layer device such as the transceiver 1020 and 1040 in FIG. 1 so the PPDU may converted to communication signals (element 510). The transmitter may then transmit the communication signals via one or more antennas or an antenna array (element 515).

Referring to FIG. 5B, the flowchart 550 begins with a receiver of a PCP device such as the receiver of transceiver 1040 in FIG. 1 receiving a communication signal via one or more antenna(s) such as an antenna element of antenna(s) 1044 (element 555). The receiver may convert the communication signal into an MPDU in accordance with the process described in the preamble (element 560). More specifically, the received signal is fed from the one or more antennas to a BF.

The receiver may extract signal information from the plurality of subcarriers in each of the frequency segments onto which information-bearing signals are modulated. Then, the demodulator demodulates the signal information via a Control PHY MCS. The signal may be deinterleaved and the frequency segments may then be deparsed.

The decoder may decode the signal information from the demodulator via, e.g., BCC or LDPC, to extract the MPDU (element 560) and transmit the MPDU to MAC sublayer logic such as MAC sublayer logic 1018 (element 565).

The MAC sublayer logic may parse the frame to determine frame field values from the MPDU (element 570). For instance, the MAC sublayer logic may determine frame field values such as the Duration field value of the frame to determine the value of the NAV reminder and then proceed to set a NAV timer based upon the NAV reminder.

The following examples pertain to further embodiments. One example comprises an apparatus to enable communication between stations in the presence of interference. The apparatus may comprise mode logic to communicate with the station in the presence of interference at the station, the interference from a communication between other stations with a first network allocation vector (NAV) reminder, by entering a Control Physical layer (PHY) mode in which a Control PHY modulation and coding scheme is enabled and a Single Carrier PHY modulation and coding scheme is disabled; and to enable the Single Carrier PHY modulation and coding scheme in response to receipt of a clear-to-send (CTS) or an expiration of a CTS timeout; and Denial to Send (DTS) logic to set a NAV timer of the apparatus based upon a second NAV reminder received in a DTS, wherein the second NAV reminder is based upon a NAV timer of the station set in response to receipt of the first NAV reminder in the communication between the other stations.

In some embodiments, the apparatus may further comprise a processor, a memory coupled with the processor, a radio coupled with a physical layer logic, and one or more antennas coupled with the radio to receive the DTS. Some embodiments may further comprise Thermal Design Parameter (TDP) logic to determine an active time remainder for the apparatus during a Contention-based access period (CBAP). Some embodiments may further comprise access logic to determine a time to access a channel in response to receipt of the DTS and based upon a predefined, maximum inactivity time for the apparatus. And in some embodiments, the mode logic comprises logic to remain beamformed while the apparatus is in the Control PHY mode.

Another embodiment comprises one or more tangible computer-readable non-transitory storage media comprising computer-executable instructions operable to, when executed by at least one computer processor, enable the at least one computer processor to implement a method comprising entering a Control Physical layer (PHY) mode in which a Control PHY modulation and coding scheme is enabled and a Single Carrier PHY modulation and coding scheme is disabled, to communicate with a station in the presence of interference at the station, the interference from a communication between other stations with a first network allocation vector (NAV) reminder and setting a NAV timer based upon a second NAV reminder received in a DTS, wherein the second NAV reminder is based upon a NAV timer of the station set in response to receipt of the first NAV reminder in the communication between other stations.

In some embodiments, the storage media further comprises determining an active time remainder during a Contention-based access period (CBAP). In some embodiments, the storage media further comprises determining a time to access a channel in response to receipt of the DTS and based upon a predefined, maximum inactivity time. In some embodiments, the storage media further comprises remaining beamformed while in the Control PHY mode.

Another embodiment may comprise a method to enable communication between stations in the presence of interference, the method comprising entering a Control Physical layer (PHY) mode in which a Control PHY modulation and coding scheme is enabled and a Single Carrier PHY modulation and coding scheme is disabled, to communicate with a station in the presence of interference at the station, the interference from a communication between other stations with a first network allocation vector (NAV) reminder and setting a NAV timer based upon a second NAV reminder received in a DTS, wherein the second NAV reminder is based upon a NAV timer of the station set in response to receipt of the first NAV reminder in the communication between the other stations.

In some embodiments, the method further comprises determining an active time remainder during a Contention-based access period (CBAP). In some embodiments, the s method further comprises determining a time to access a channel in response to receipt of the DTS and based upon a predefined, maximum inactivity time. In some embodiments, the method further comprises remaining beamformed while in the Control PHY mode.

In a further embodiment, a system may enable communication between stations in the presence of interference. The system may comprise a processor, a memory coupled with the processor, a radio coupled with a physical layer logic, and one or more antennas coupled with the radio to receive the DTS; mode logic to communicate with the station in the presence of interference at the station, the interference from a communication between other stations with a first network allocation vector (NAV) reminder, by entering a Control Physical layer (PHY) mode in which a Control PHY modulation and coding scheme is enabled and a Single Carrier PHY modulation and coding scheme is disabled; and to enable the Single Carrier PHY modulation and coding scheme in response to receipt of a clear-to-send (CTS) or an expiration of a CTS timeout; and Denial to Send (DTS) logic to set a NAV timer of the apparatus based upon a second NAV reminder received in a DTS, wherein the second NAV reminder is based upon a NAV timer of the station set in response to receipt of the first NAV reminder in the communication between the other stations.

In some embodiments, the system may further comprise a processor, a memory coupled with the processor, a radio coupled with a physical layer logic, and one or more antennas coupled with the radio to receive the DTS. Some embodiments may further comprise Thermal Design Power (TDP) logic to determine an active time remainder for the apparatus during a Contention-based access period (CBAP). Some embodiments may further comprise access logic to determine a time to access a channel in response to receipt of the DTS and based upon a predefined, maximum inactivity time for the apparatus. And in some embodiments, the mode logic comprises logic to remain beamformed while the apparatus is in the Control PHY mode.

Another embodiment comprises an apparatus to enable communication between stations in the presence of interference, the apparatus comprising a medium access control logic to receive a control frame with a first network allocation vector (NAV) reminder from a communication between other stations; to set a NAV timer for the apparatus based upon the NAV reminder; to enter a Control Physical layer (PHY) mode with a Control PHY modulation and coding scheme enabled and a Single Carrier (SC) PHY modulation and coding scheme disabled in response to receiving the control frame; and to transmit a Denial to Send (DTS) in response to receipt of a Ready to Send from a transmitting station while the NAV timer is not reset; and a physical layer logic coupled with the medium access control logic to receive the packet.

In some embodiments, the apparatus further comprises a processor, a memory coupled with the processor, a radio coupled with the physical layer logic, and one or more antennas coupled with the radio to receive the response. In some embodiments, the medium access control logic comprises logic to enable the SC PHY modulation and coding scheme after receipt of a Ready to Send from a transmitting station while the NAV timer is reset. In some embodiments, the medium access control logic comprises logic to remain beamformed while the apparatus is in the Control PHY mode.

Another embodiment comprises one or more tangible computer-readable non-transitory storage media comprising computer-executable instructions operable to, when executed by at least one computer processor, enable the at least one computer processor to implement a method comprising receiving a control frame with a first network allocation vector (NAV) reminder from a communication between other stations; setting a NAV timer based upon the NAV reminder; entering a Control Physical layer (PHY) mode with a Control PHY modulation and coding scheme enabled and a Single Carrier (SC) PHY modulation and coding scheme disabled in response to receiving the control frame; and transmitting a Denial to Send (DTS) in response to receipt of a Ready to Send from a transmitting station while the NAV timer is not reset.

Some embodiments may further comprise enabling the SC PHY modulation and coding scheme after receipt of a Ready to Send from a transmitting station while the NAV timer is reset. Some embodiments may further comprise remaining beamformed while in the Control PHY mode.

Another embodiment may comprise a system to enable reverse direction communication with improved power efficiency, the system comprising a processor; a memory coupled with the processor; a medium access control logic to receive a control frame with a first network allocation vector (NAV) reminder from a communication between other stations; to set a NAV timer for the apparatus based upon the NAV reminder; to enter a Control Physical layer (PHY) mode with a Control PHY modulation and coding scheme enabled and a Single Carrier (SC) PHY modulation and coding scheme disabled in response to receiving the control frame; and to transmit a Denial to Send (DTS) in response to receipt of a Ready to Send from a transmitting station while the NAV timer is not reset; and a physical layer logic coupled with the medium access control logic to receive the packet.

In some embodiments, the medium access control logic comprises logic to enable the SC PHY modulation and coding scheme after receipt of a Ready to Send from a transmitting station while the NAV timer is reset. In some embodiments, the medium access control logic comprises logic to remain beamformed while the apparatus is in the Control PHY mode.

In some embodiments, a method may enable communication between stations in the presence of interference. The method may comprise receiving a control frame with a first network allocation vector (NAV) reminder from a communication between other stations; setting a NAV timer based upon the NAV reminder; entering a Control Physical layer (PHY) mode with a Control PHY modulation and coding scheme enabled and a Single Carrier (SC) PHY modulation and coding scheme disabled in response to receiving the control frame; and transmitting a Denial to Send (DTS) in response to receipt of a Ready to Send from a transmitting station while the NAV timer is not reset.

Some embodiments, may further comprise enabling the SC PHY modulation and coding scheme after receipt of a Ready to Send from a transmitting station while the NAV timer is reset. Some embodiments, may further comprise remaining beamformed while in the Control PHY mode.

Another embodiment may comprise an apparatus to enable communication between stations in the presence of interference, the apparatus comprising: a means for entering a Control Physical layer (PHY) mode in which a Control PHY modulation and coding scheme is enabled and a Single Carrier PHY modulation and coding scheme is disabled, to communicate with a station in the presence of interference at the station, the interference from a communication between other stations with a first network allocation vector (NAV) reminder and a means for setting a NAV timer based upon a second NAV reminder received in a DTS, wherein the second NAV reminder is based upon a NAV timer of the station set in response to receipt of the first NAV reminder in the communication between the other stations.

Some embodiments comprise a means for determining an active time remainder during a Contention-based access period (CBAP). Some embodiments comprise a means for determining a time to access a channel in response to receipt of the DTS and based upon a predefined, maximum inactivity time. Some embodiments comprise a means for remaining beamformed while in the Control PHY mode.

Another embodiment may comprise an apparatus to enable communication between stations in the presence of interference. The apparatus may comprise a means for receiving a control frame with a first network allocation vector (NAV) reminder from a communication between other stations; a means for setting a NAV timer based upon the NAV reminder; a means for entering a Control Physical layer (PHY) mode with a Control PHY modulation and coding scheme enabled and a Single Carrier (SC) PHY modulation and coding scheme disabled in response to receiving the control frame; and a means for transmitting a Denial to Send (DTS) in response to receipt of a Ready to Send from a transmitting station while the NAV timer is not reset.

Some embodiments may further comprise a means for enabling the SC PHY modulation and coding scheme after receipt of a Ready to Send from a transmitting station while the NAV timer is reset. Some embodiments may further comprise a means for remaining beamformed while in the Control PHY mode.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

Another embodiment is implemented as a program product for implementing systems and methods described with reference to FIGS. 1-5. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. An apparatus to enable communication between stations in the presence of interference, the apparatus comprising:
   a memory to store code;
   a processor coupled with the memory to implement the code to perform medium access control (MAC) logic, the processor:
   to receive a network allocation vector (NAV) reminder from a communication between other stations;

to enter a Control Physical layer (PHY) mode in which a Control PHY modulation and coding scheme is enabled and other supported modulation and coding schemes are disabled, in response to receipt of the NAV reminder;

to determine a time to access a channel in response to receipt of the NAV reminder associated with the interference and based upon the NAV reminder and a predefined time period for which the apparatus may remain inactive during an access period; and to enable one or more of the other supported modulation and coding schemes in response to receipt of a clear-to-send (CTS) or an expiration of a CTS timeout.

2. The apparatus of claim 1, further comprising:
a radio coupled with a physical layer device, and
one or more antennas coupled with the radio to receive the NAV reminder.

3. The apparatus of claim 1, wherein the memory comprises code for execution by the processor to implement Thermal Design Parameter (TDP) logic to determine an active time remainder for the apparatus during a Contention-based access period (CBAP).

4. The apparatus of claim 1, wherein the memory comprises code for execution by the processor to implement Denial to Send (DTS) logic to set a NAV timer of the apparatus based upon the NAV reminder received in a DTS.

5. The apparatus of claim 1, wherein the memory comprises code for execution by the processor to remain beamformed while the apparatus is in the Control PHY mode and to enable a Single Carrier PHY modulation and coding scheme of the other supported modulation and coding schemes in response to receipt of the clear-to-send (CTS) or the expiration of a CTS timeout.

6. One or more tangible computer-readable non-transitory storage media comprising computer-executable instructions operable to, when executed by at least one computer processor, enable the at least one computer processor to implement a method comprising:

receiving a first network allocation vector (NAV) reminder from a communication between other stations;

entering a Control Physical layer (PHY) mode in which a Control PHY modulation and coding scheme is enabled and other supported modulation and coding schemes are disabled, in response to receipt of the first NAV reminder;

determining a time to access a channel in response to receipt of the first NAV reminder and based upon the first NAV reminder and a predefined time period to remain inactive during an access period; and enabling one or more of the other supported modulation and coding schemes in response to receipt of a clear-to-send (CTS) or an expiration of a CTS timeout.

7. The one or more tangible computer-readable non-transitory storage media of claim 6, further comprising determining an active time remainder during a Contention-based access period (CBAP).

8. The one or more tangible computer-readable non-transitory storage media of claim 6, further comprising setting a NAV timer based upon a second NAV reminder received in a Denial to Send (DTS).

9. The one or more tangible computer-readable non-transitory storage media of claim 6, further comprising remaining beamformed while in the Control PHY mode.

10. A method to enable communication between stations in the presence of interference, the method comprising:

receiving a first network allocation vector (NAV) reminder from a communication between other stations;

entering a Control Physical layer (PHY) mode in which a Control PHY modulation and coding scheme is enabled and other supported modulation and coding schemes are disabled, in response to receipt of the first NAV reminder;

determining a time to access a channel in response to receipt of the first NAV reminder and based upon the first NAV reminder and a predefined time period to remain inactive during an access period; and enabling one or more of the other supported modulation and coding schemes in response to receipt of a clear-to-send (CTS) or an expiration of a CTS timeout.

11. The method of claim 10, further comprising determining an active time remainder during a Contention-based access period (CBAP).

12. The method of claim 10, further comprising setting a NAV timer based upon a second NAV reminder received in a Denial to Send (DTS).

13. The method of claim 10, further comprising remaining beamformed while in the Control PHY mode.

14. An apparatus to enable communication between stations in the presence of interference, the apparatus comprising;

a memory to store code;
a processor coupled with the memory to implement the code to perform medium access control (MAC) logic, the processor to:

receive a control frame with a first network allocation vector (NAV) reminder from a communication between other stations;

set a NAV timer for the apparatus based upon the first NAV reminder;

enter a Control Physical layer (PHY) mode with a Control PHY modulation and coding scheme enabled and other supported modulation and coding schemes disabled in response to receipt of the first NAV reminder;

transmit a Denial to Send (DTS) in response to receipt of a Ready to Send (RTS) from a transmitting station while the NAV timer is not reset;

enable one or more of the other supported modulation and coding schemes in response to receipt of a second RTS while the NAV timer is reset; and a physical layer device coupled with the medium access control logic to receive the control frame.

15. The apparatus of claim 14, further comprising
a radio coupled with the physical layer device, and
one or more antennas coupled with the radio to receive the control frame.

16. The apparatus of claim 14, wherein the memory comprises code for execution by the processor to enable a SC PHY modulation and coding scheme of the other supported modulation and coding schemes after receipt of a different Ready to Send from the transmitting station while the NAV timer is reset.

17. The apparatus of claim 14, wherein the memory comprises code for execution by the processor to remain beamformed while the apparatus is in the Control PHY mode.

18. One or more tangible computer-readable non-transitory storage media comprising computer-executable instructions operable to, when executed by at least one computer processor, enable the at least one computer processor to implement a method comprising:

receiving a control frame with a first network allocation vector (NAV) reminder from a communication between other stations;

setting a NAV timer based upon the first NAV reminder;

entering a Control Physical layer (PHY) mode with a Control PHY modulation and coding scheme enabled and other supported modulation and coding schemes disabled in response to receipt of the first NAV reminder;

transmitting a Denial to Send (DTS) in response to receipt of a Ready to Send (RTS) from a transmitting station while the NAV timer is not reset; and enabling one or more of the other supported modulation and coding schemes in response to receipt of a second RTS while the NAV timer is reset.

19. The one or more tangible computer-readable non-transitory storage media of claim 18, further comprising enabling a SC PHY modulation and coding scheme of the other supported modulation and coding schemes after receipt of a different Ready to Send from the transmitting station while the NAV timer is reset.

20. The one or more tangible computer-readable non-transitory storage media of claim 18, further comprising remaining beamformed while in the Control PHY mode.

21. A method to enable communication between stations in the presence of interference, the method comprising:

receiving a control frame with a first network allocation vector (NAV) reminder from a communication between other stations;

setting a NAV timer based upon the first NAV reminder;

entering a Control Physical layer (PHY) mode with a Control PHY modulation and coding scheme enabled and other supported modulation and coding schemes disabled in response to receipt of the first NAV reminder; and transmitting a Denial to Send (DTS) in response to receipt of a Ready to Send (RTS) from a transmitting station while the NAV timer is not reset; and enabling one or more of the other supported modulation and coding schemes in response to receipt of a second RTS while the NAV timer is reset.

22. The method of claim 21, further comprising enabling a SC PHY modulation and coding scheme of the other supported modulation and coding schemes after receipt of a different Ready to Send from the transmitting station while the NAV timer is reset.

23. The method of claim 21, further comprising remaining beamformed while in the Control PHY mode.

* * * * *

UNITED STATES PATENT AND TRADEMARK OFFICE
CERTIFICATE OF CORRECTION

PATENT NO.         : 9,923,663 B2                                          Page 1 of 2
APPLICATION NO.    : 14/229792
DATED              : March 20, 2018
INVENTOR(S)        : Solomon B. Trainin, Tom Harel and Igor Brainman It is certified that error appears in the above-identified patent and that said Letters Patent is hereby corrected as shown below:

On the Title Page

Abstract, Line 14, replace "time. Logic may remain" with -- time. And logic may remain --.

In the Specification

Column 1, Line 21, replace "communications and the greater" with -- communications. The greater --.

Column 6, Line 28, replace "1039" with -- 1069 --.

Column 8, Line 35, replace "communications but the receiving" with -- communications 2010 but the receiving --.

Column 8, Line 61, replace "transmits an RTS2" with -- transmits 2015 an RTS2 --.

Column 8, Line 66, replace "2024" with -- 2022 --.

Column 8, Line 66, replace "responds with a" with -- responds 2015 with a --.

Column 9, Line 23, replace "cTDP_time-remainder in duration" with -- cTDP_time-remainder 2246 in duration --.

Column 9, Line 26, replace "End 2243 that truncates" with -- End 2243, received by RX2 (RX CF-End 2244), that truncates --.

Column 9, Line 34, replace "transmits an RTS2" with -- transmits 2015 an RTS2 --.

Column 9, Line 36, replace "transmitting data 2262" with -- transmitting 2015 data 2262 --.

Signed and Sealed this
Third Day of July, 2018

Andrei Iancu
*Director of the United States Patent and Trademark Office*

Column 9, Line 37, replace "(SIFS) 2281 thereafter. At" with -- (SIFS) 2281 after time 2280. At --.

Column 9, Line 37, replace "the point of" with -- the time 2270 of --.

Column 9, Line 41, replace "transmission is completed" with -- transmission 2015 is completed --.

Column 9, Line 41-42, replace "transmit a CF-End 2283" with -- transmit 2015 a CF-End 2283 --.

Column 9, Line 43, replace "transmit a CF-End 2284" with -- transmit 2015 a CF-End 2284 --.

Column 12, Line 49, replace "to the RTS then" with -- to the RTS (element 355) then --.

Column 12, Line 51, replace "to the RTS then" with -- to the RTS (element 355) then --.

Column 12, Line 54, replace "to the RTS, e.g.," with -- to the RTS (element 355), e.g., --.